US011760431B2

(12) United States Patent
Main et al.

(10) Patent No.: US 11,760,431 B2
(45) Date of Patent: Sep. 19, 2023

(54) BICYCLE SEAT FOR IMPROVED COMFORT, PERFORMANCE, AND SAFETY

(71) Applicant: Xsensor Technology Corporation, Calgary (CA)

(72) Inventors: Ian Main, Calgary (CA); Christine J. Gonis, Calgary (CA); Jeffrey Chao-Hsin Li, Calgary (CA)

(73) Assignee: XSENSOR Technology Corporation, Calgary (CA)

( * ) Notice: Subject to any disclaimer, the term of this patent is extended or adjusted under 35 U.S.C. 154(b) by 0 days.

(21) Appl. No.: 17/485,327

(22) Filed: Sep. 25, 2021

(65) Prior Publication Data

US 2022/0009575 A1 Jan. 13, 2022

Related U.S. Application Data

(63) Continuation-in-part of application No. 17/338,530, filed on Jun. 3, 2021, which is a continuation of application No. 16/590,226, filed on Oct. 1, 2019, now Pat. No. 11,052,958.

(60) Provisional application No. 63/083,875, filed on Sep. 26, 2020, provisional application No. 62/740,348, filed on Oct. 2, 2018.

(51) Int. Cl.
*B62J 1/00* (2006.01)
*B62J 1/08* (2006.01)

(52) U.S. Cl.
CPC ..................................... *B62J 1/08* (2013.01)

(58) Field of Classification Search
CPC ..... B62J 1/005; B62J 1/08; B62J 1/002; B62J 1/007; B62J 1/00; B62J 1/10
See application file for complete search history.

(56) References Cited

U.S. PATENT DOCUMENTS

| 604,347 | A | * | 5/1898 | Bray | B62J 1/005 |
| | | | | | 297/201 |
| 4,089,559 | A | | 5/1978 | Prange et al. | |
| 4,512,608 | A | | 4/1985 | Erani | |
| 4,541,668 | A | | 9/1985 | Rouw | |
| 4,877,286 | A | | 10/1989 | Hobson et al. | |
| 5,108,076 | A | | 4/1992 | Chiarella | |
| 5,356,205 | A | | 10/1994 | Calvert et al. | |
| 5,670,232 | A | | 9/1997 | Bigolin | |

(Continued)

FOREIGN PATENT DOCUMENTS

WO WO 2009/040771 A1 4/2009

OTHER PUBLICATIONS

PCT International Search Report and Written Opinion, PCT Application No. PCT/IB2021/058747, dated Feb. 4, 2022, 12 pages.

(Continued)

*Primary Examiner* — Shin H Kim
(74) *Attorney, Agent, or Firm* — Fenwick & West LLP

(57) ABSTRACT

A seat for a pedal-powered vehicle is described. The seat includes a support frame, a seat element and a nose. The seat element and the nose are implemented as separated components and are supported by the support frame. The seat element is configured to support at least part of a rider's weight. The seat element carries a pressure-relieving region that is configured to be located at a location corresponding to an ischial tuberosity (IT) of the rider, thereby relieving pressure exerted on the rider's IT's.

19 Claims, 10 Drawing Sheets

(56) References Cited

U.S. PATENT DOCUMENTS

| | | | |
|---|---|---|---|
| 5,863,094 | A | 1/1999 | Endo |
| 6,209,954 | B1 | 4/2001 | Bombardier |
| 6,357,825 | B1 | 3/2002 | Bavaresco |
| 6,761,400 | B2 | 7/2004 | Hobson |
| 7,249,800 | B2 | 7/2007 | Jalkanen |
| 9,321,496 | B2 | 4/2016 | Curless |
| 9,493,203 | B2 * | 11/2016 | Portz .................. B62J 1/005 |
| 9,663,166 | B2 * | 5/2017 | Hamel ................. B62J 1/007 |
| 9,745,010 | B2 * | 8/2017 | Bailie .................. B62J 1/18 |
| 9,821,867 | B2 * | 11/2017 | Goff .................... B62J 1/08 |
| 10,106,217 | B1 | 10/2018 | Hsu |
| 10,435,097 | B2 * | 10/2019 | Jay ..................... B62J 1/005 |
| 10,618,583 | B1 | 4/2020 | Marc |
| 11,052,958 | B2 * | 7/2021 | Main ................... B62J 1/08 |
| 11,459,049 | B2 * | 10/2022 | Main ................... B62J 1/04 |
| 2004/0004375 | A1 | 1/2004 | Garland et al. |
| 2004/0174051 | A1 | 9/2004 | Scholz |
| 2006/0255631 | A1 | 11/2006 | Ljubich |
| 2007/0069556 | A1 * | 3/2007 | Bleloch .............. B62J 1/005 |
| | | | 297/195.1 |
| 2007/0257527 | A1 * | 11/2007 | Marc .................. B62J 1/04 |
| | | | 297/215.1 |
| 2008/0007099 | A1 * | 1/2008 | Chuang ............... B62J 1/007 |
| | | | 297/214 |
| 2012/0286548 | A1 | 11/2012 | Bailie et al. |
| 2015/0035326 | A1 | 2/2015 | Wong et al. |
| 2015/0130234 | A1 | 5/2015 | Bailie et al. |
| 2015/0251717 | A1 | 9/2015 | Portz |
| 2016/0068212 | A1 | 3/2016 | Hamel |
| 2016/0144914 | A1 | 5/2016 | Jay |
| 2016/0167726 | A1 | 6/2016 | Dudley, II |
| 2017/0073028 | A1 | 3/2017 | Petty |
| 2017/0233020 | A1 | 8/2017 | Goff |
| 2018/0015975 | A1 * | 1/2018 | Pizarro ............... B62J 1/007 |
| 2018/0057089 | A1 | 3/2018 | Toll |
| 2020/0102033 | A1 | 4/2020 | Main et al. |
| 2020/0385077 | A1 * | 12/2020 | Petty ................... B62J 1/005 |
| 2021/0294936 | A1 * | 9/2021 | Baryudin ............. B62J 45/416 |
| 2021/0331758 | A1 * | 10/2021 | Main ................... B62J 1/08 |
| 2022/0009575 | A1 * | 1/2022 | Main ................... B62J 1/10 |

OTHER PUBLICATIONS

Cycling Weekly, "Prologo Nago Evo Ti 1.4. English Pound.100," Jan. 1, 1970, two pages [Online] [Retrieved on Dec. 10, 2019] Retrieved from the Internet <URL: https://www.cyclingweekly.com/reviews/saddles-seatposts/prologo-nago-evo--ti-1-4-1 00>.

Kuvo-Tec, "Planches Usinables," Date Unknown, one page [Online] [Retrieved on Dec. 10, 2019] Retrieved from the Internet <URL: http://www.kuvotec.com/nos-produits/planches-usinables/index.html>.

Kuvo-Tec, "PU-120-RE," Date Unknown, one page [Online] [Retrieved on Dec. 10, 2019] Retrieved from the Internet <URL: http://www.kuvotec.com/nos-produits/resines-a-couler/pu-120-re/index.html->.

The National Industrial Property of France, Office Action, FR Patent Application No. FR1910911, dated Jan. 28, 2021, 15 pages.

youtube.com, "Les muscles de la cuisse: les ischio-jambiers," Feb. 29, 2012, one page [Online] [Retrieved on Dec. 10, 2019] Retrieved from the Internet <URL: https://www.youtube.com/watch?v=YBIOm_DBQ48>.

United States Office Action, U.S. Appl. No. 16/590,226, dated Oct. 16, 2020, eight pages.

United States Office Action, U.S. Appl. No. 17/338,530, dated Jan. 21, 2022, eight pages.

* cited by examiner

BICYCLE SEAT FOR IMPROVED COMFORT, PERFORMANCE, AND SAFETY

CROSS REFERENCE TO RELATED APPLICATIONS

This application claims the benefit of U.S. Provisional Patent Application No. 63/083,875 filed on Sep. 26, 2020, which is incorporated by reference for all purposes. This application is also a continuation in part of U.S. patent application Ser. No. 17/338,530, filed on Jun. 3, 2021, which is a continuation of U.S. patent application Ser. No. 16/590,226 (now U.S. Pat. No. 11,052,958), filed on Oct. 1, 2019, which claims the benefit of priority to U.S. Provisional Patent Application No. 62/740,348, filed on Oct. 2, 2018, all of which are incorporated herein by reference in their entirety for all purposes. Additionally, U.S. Patent Publication 2020/0102033, published on Apr. 2, 2020, entitled "Bicycle Seats," is also incorporated by reference for all purposes.

TECHNICAL FIELD

The disclosed embodiments generally relate to sporting equipment and more specifically to bicycle seats.

BACKGROUND

Bicycle saddles (e.g., seats) receive a significant portion of the body's weight while cycling, but unfortunately current designs do not suit most cyclists' anatomy, resulting in discomfort, restricted blood flow, bruising in sensitive areas, and may even lead to permanent damage. Much of the body's weight while cycling rests on the ischial tuberosities, aka IT's or sit-bones. These bony protrusions vary in width between people, meaning that even if a bike seat is designed to provide sufficient cushioning, it likely will not fit the rider's individual anatomy. Most riders resort to purchasing and using a chamois short—a padded and wicking garment meant to protect the cyclist from the saddle. Thus, there is need for an adaptable bicycle seat form that better fits the user's anatomy while still ensuring a full range of motion for the cyclist.

SUMMARY

The bicycle seat described herein has multiple regions constructed to support the body. These regions include ischial tuberosity (IT) regions for relieving pressure on the IT bones as well as a flexible forward edge to conform to a rider's anatomy. These regions provide a variety of supports to avoid excess pressure on any one area of the rider's anatomy. The bicycle seat design described may be adjustable or have interchangeable parts to allow a use to customize the fit to their personal anatomy.

The seat is suitable for any pedal-powered vehicle and comprises a support frame, a seat element and a nose. The seat element and the nose are implemented as separate components that are supported by the support frame. The seat element is configured to support at least a portion of a rider's weight. The seat element carries a pressure-relieving region that is configured to be located at a location corresponding to an ischial tuberosity (IT) bone of the rider, thereby relieving pressure exerted on the IT bones of the rider.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that, wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

This bicycle saddle design addresses rider discomfort and relieves potentially harmful pressure with one or more features including, but not limited to: IT regions with targeted pressure relieving geometry to accommodate IT movements while providing soft cushioning, a flexible forward edge, and an adjustable width for variations in hip width and IT location. The described bicycle seat design may include any one or more features described herein.

The bicycle seat design is described below in reference to a series of figures. The embodiments of the seat and seat elements shown in FIGS. 1-3 and 6-10 may represent the same seat or a variety of possible configurations of the seat.

Figure 1:
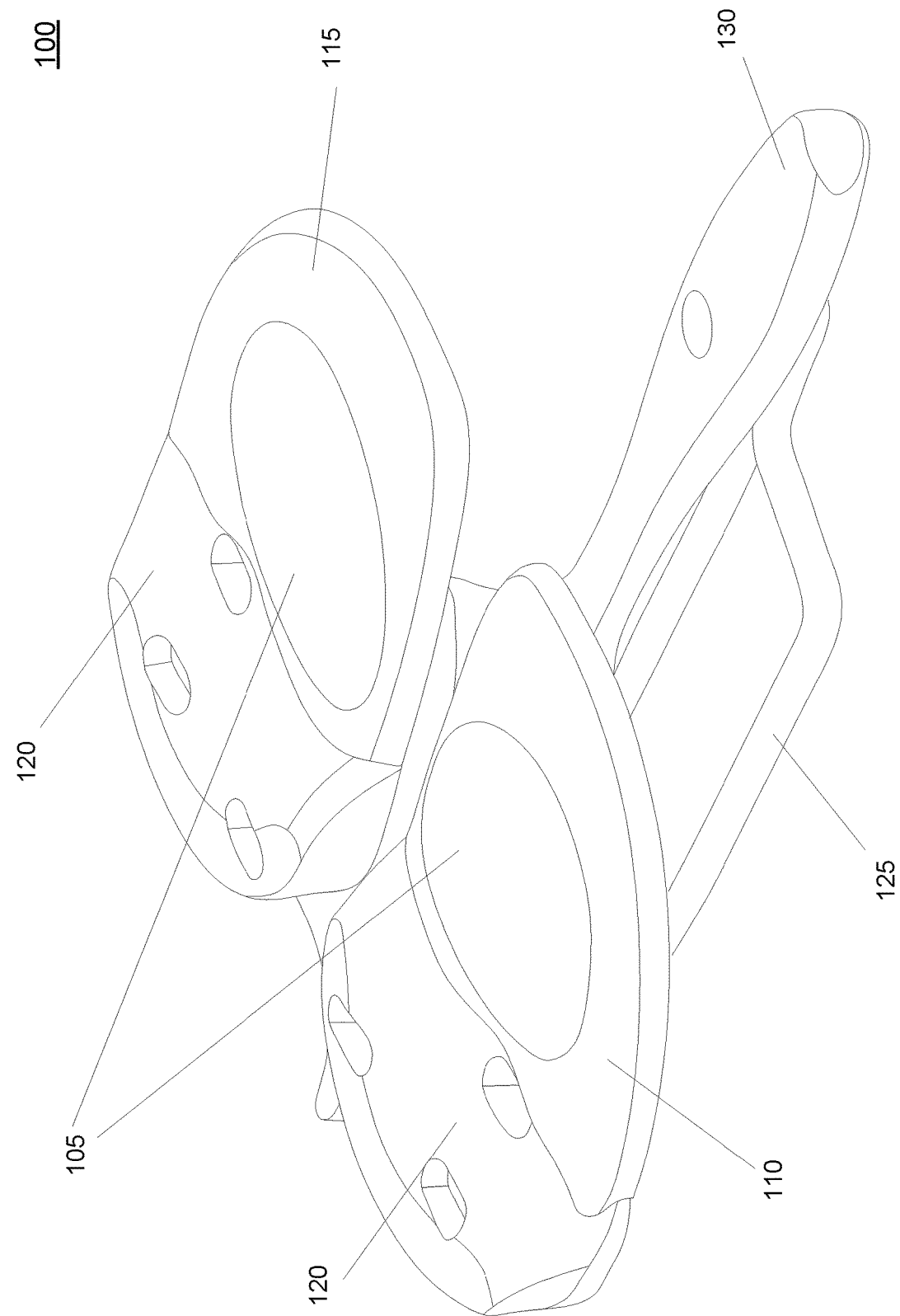
FIG. 1 is a perspective view of a bicycle seat, according to some embodiments.

FIG. 1 is a perspective view of an example bicycle seat 100, in accordance with some embodiments. The bicycle seat 100 may be coupled, via a support frame 125, to a pedal-powered vehicle such as a bicycle or unicycle. The bicycle seat 100 may be used in other pedal-powered vehicles such as tricycles, unicycles, aircrafts, paddle boats, hydrocycles, and the like. Pedal-powered vehicles described herein also include stationary equipment such as gym bicycles, exercise bicycles, athlete training bicycles and other indoor bicycles. The support frame 125 may carry attachment regions on which the bicycle seat 100 may be mounted to the support frame 125, and on which the support frame 125 can be mounted to the bicycle body. In some embodiments, the bicycle seat 100 may include one or more seat elements 110/115 and a nose 130. As shown in FIG. 1, the bicycle seat 100 has two seat elements, a first seat element 110 and a second seat element 115. The two seat elements are implemented as separate components that are symmetrical. In other embodiments, bicycle seat 100 may have only one seat element, while some embodiments may have more than two. The seat elements 110/115 support at least part of, the majority of, or the entirety of the weight of a rider. The nose 130 provides balancing and allows for a full range of motion of the rider. In some embodiments, the seat elements 110/115 and the nose 130 are implemented as separate components and may be connected to the support frame 125. In various embodiments, the seat elements 1110/115 may be implemented in any suitable manner, singular or paired, symmetrical or irregular, integrated or removable.

In some embodiments, the seat elements 110/115 include one or more pressure-relieving regions that may be referred to as ischial tuberosity (IT) regions 105. The seat elements 110/115 and the IT regions 105 may be configured such that the IT regions 105 have lower spring constant than that of the seat elements 110/115. The difference in spring constants between the IT regions 105 and the seat elements 110/115 allows the IT regions 105 to act as cushions to reduce pressure exerted on the IT bones. For example, the seat element may be constructed of dense foam while the IT regions 105 may be constructed of less dense foam that collapses more readily under pressure.

The seat 100 may additionally have a raised rear portion 120 associated with each seat element 110/115. The raised rear portion 120 may improve the stability and support of the rider by providing more surface area on which the body of the rider contacts the seat 100. The additional surface area also allows for further distribution of the weight of the rider to decrease high pressure on the IT bones.

Figures 2A, 2B:
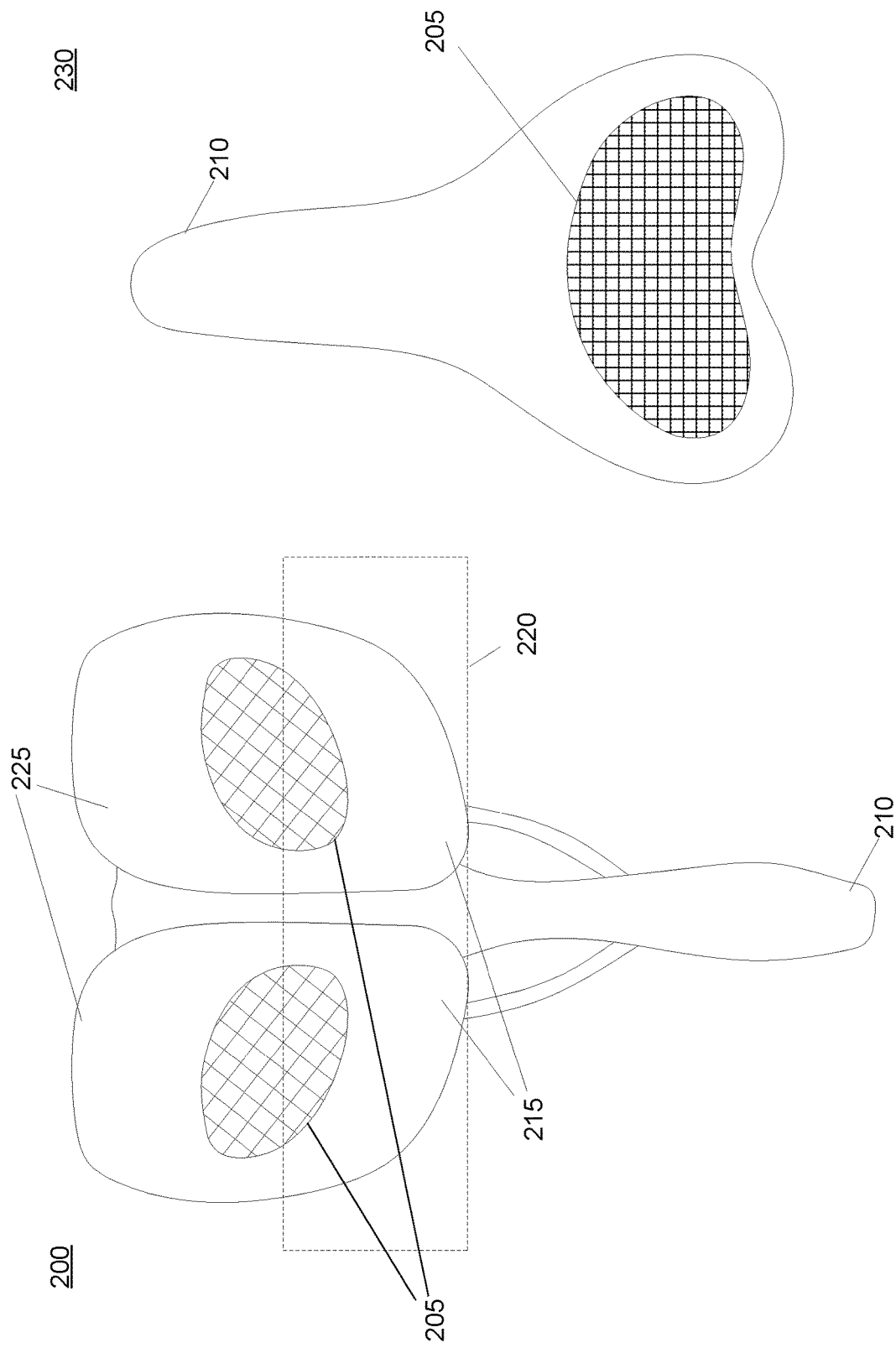
FIG. 2A is a top-view illustration of a bicycle seat with IT regions, according to some embodiments.
FIG. 2B is a top-view illustration of another bicycle seat, according to some embodiments

FIG. 2A is a top view of the bicycle seat 200, in accordance with some embodiments. The IT regions 205 may be incorporated into any bicycle seat design. The IT regions 205 may be an embodiment of the IT regions 105 of the seat 100 shown in FIG. 1. The seat 200 features two seat elements 225. In some embodiments the seat elements 225 may be mounted on an adjustment mechanism that allows for their orientation of position to be changes. For example, a rider may be able to adjust the width between the seat elements 225 such that the IT regions 205 are aligned comfortably with the personal anatomy of the rider. The embodiment of FIG. 2A further includes a flexion region 220. The portions of the seat within the flexion region 220 are configured to be flexible and bend to conform to the rider. The flexion region 220 includes the flexible forward edge 215. The seat elements 225 may include a raised rear portion similar to the raised rear portion 120 of FIG. 1. The raised rear portion offers additional surface area for support of the rider. In some embodiments, the area between the forward edges 215 and nose 210 may be curved or otherwise formed to create a clearance for the personal anatomy of the rider.

FIG. 2B is a top view of another bicycle seat 230, in accordance with some embodiments. The seat 230 is configured in the form of a traditional bicycle seat in a single piece. As such, the seat 230 lacks the flexion region 220 of seat 200. While the IT regions 205 in some embodiments are shown to be two separate pockets, in other embodiments, such as the seat 230 shown in FIG. 2B, the IT region 205 may be implemented as a single piece. In the single IT region 205 embodiment shown in FIG. 2B, the IT region 205 may also provide pressure relief for the tail bone of the rider and be preferable to some riders. The composition of the IT regions 205 shown in FIG. 2A and FIG. 2B may be the same or different. In some embodiments, while the seat 230 is implemented as a single piece, the seat element may include a pair of IT regions 205 at suitable locations that correspond to the locations of the IT bones of the rider.

Figure 3:
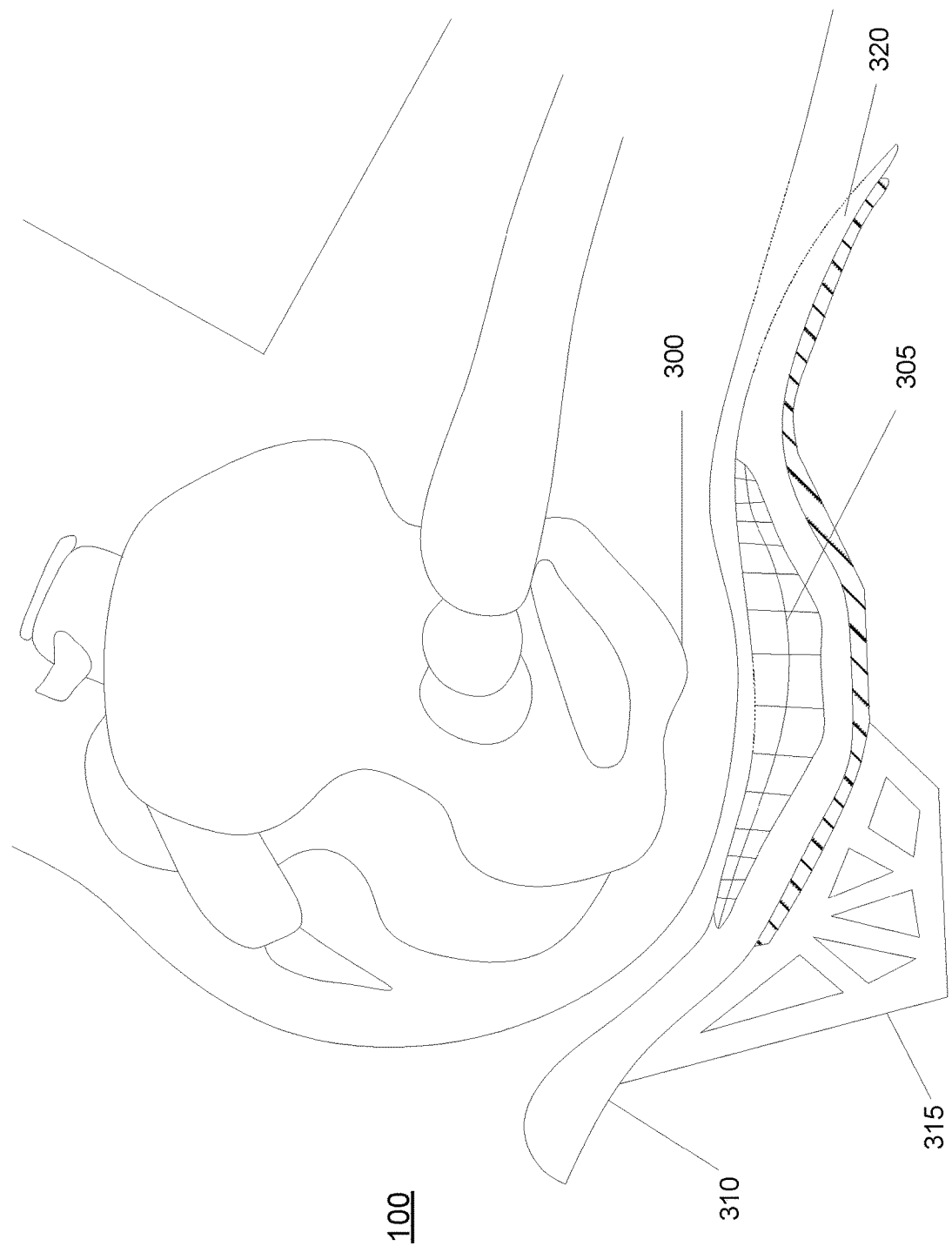
FIG. 3 is a side-view illustration of the bicycle seat with IT regions, according to some embodiments.

FIG. 3 is a conceptual side view of a bicycle seat 100 having an IT region 305, according to some embodiments. The area where the IT bones 300 of the rider meet the seat is the location of the IT region 305, in some embodiments. The IT region 305 may be softer and more easily conformed to than the rest of the seat element 310, which allows pressure relief for the IT bones 300. The IT region 305 includes a cushioning material such as an elastomer, foam, gel, other materials, or combinations thereof. The IT region 305 is embedded in or attached to the seat element 310. The seat element 310 is coupled to a pedal powered vehicle such as a bike via a support frame 315. The seat element 310 may be made of a rigid material such that it is firmer than the IT region 305. A forward edge 320 of the seat element 310 may be flexible such that as the legs of the rider move to pedal, the forward edge 320 bends to conform to their movement. With the exception of the forward edge 320, the seat element 310 is firm and/or stationary to provide stability.

User Anatomy and Current Designs of Bicycle Seats

On a traditional bicycle, the saddle (also referred to as the "seat") is affixed to a seat post of the bicycle and the weight of the rider is distributed between the handlebars, pedals, and seat. Throughout the cycle of rotation of the pedals, the body's weight will shift, transferring force to the pedals. Other functions such as braking and steering also require the rider to use their weight for balancing and altering the motion of the bicycle. Seats must allow for these different movements without restricting the rider.

The seat receives the cyclist's weight predominantly on their ischial tuberosities (referred to as IT's, IT bones, or sit-bones). These bony protrusions are part of the pelvis, and the origin point of the hamstrings. The IT bones are typically wider in females than in males and individual variances in width may be as much as or more than 8 cm. Individuals often have difficulty finding a saddle that suits their anatomy, and an ill-fitting saddle may lead to discomfort or pain.

Figure 4:
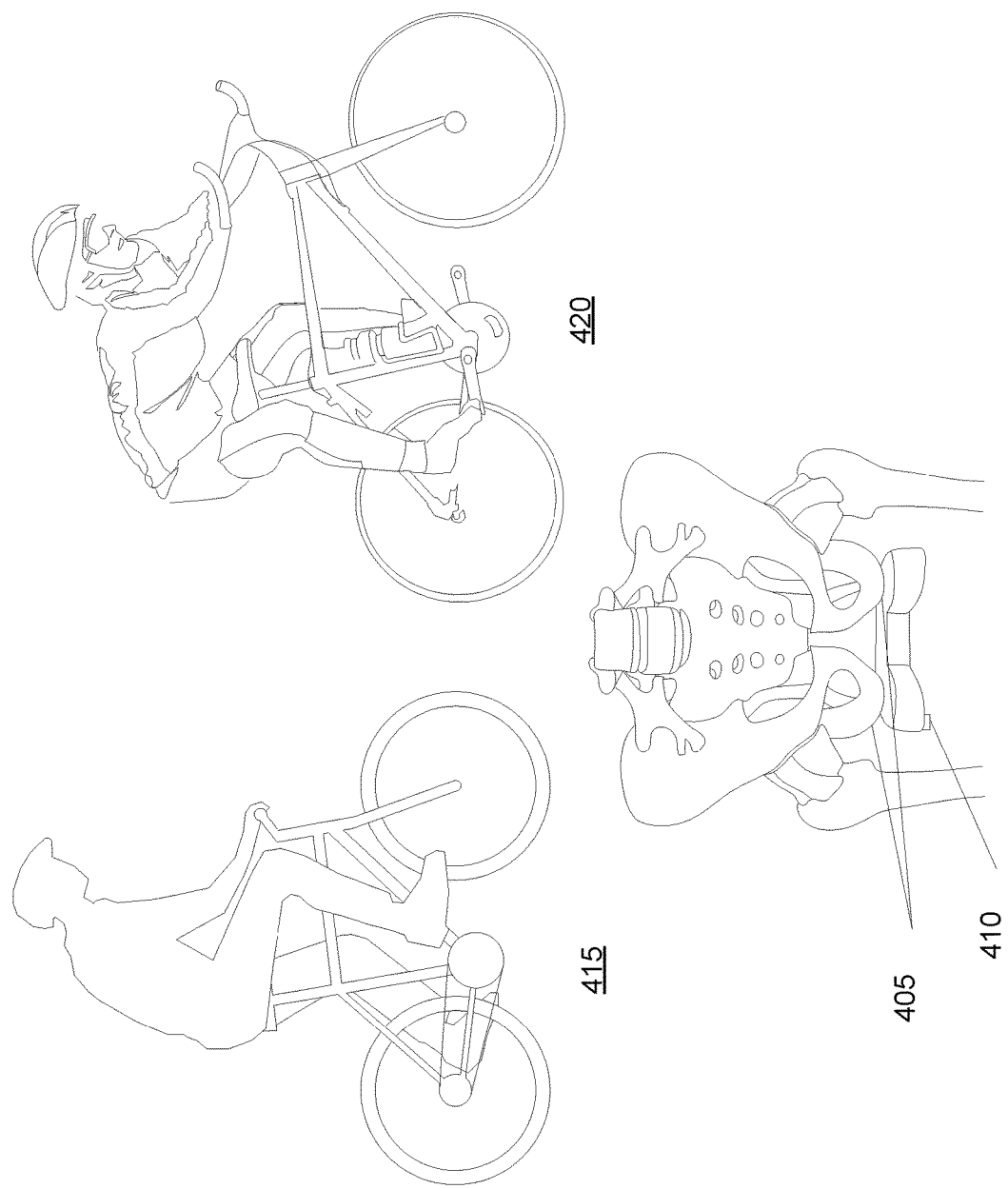
FIG. 4 is an illustration of upright and aerodynamic positions for riding a bicycle and of the skeletal structure of the body showing the IT bones resting on a bicycle seat.

FIG. 4 is an illustration of upright and aerodynamic positions for riding a bicycle and of the skeletal structure of the body showing the IT bones resting on a seat element 410. Cyclists typically ride in an upright position 415 or lean forward into a more aerodynamic position 420. In the upright position 415 the rider's weight is on their ITs. When the rider switches to the aerodynamic position 420 their weight shifts forward and may partially rest on the pubic bone, or perineal area. Pressure in this area may result in rider injury such as genital numbness, inflammation, and even more serious conditions such as impotence and infertility. Because the IT bones 405 are the main contact point of the body with the seat element 410, they are areas of high pressure that may cause pain to the rider. As such, the IT regions shown in FIGS. 1, 2 and 3 are configured to re-distribute pressure from supporting the rider away from the IT bones and spread the pressure more evenly over the rider's buttocks so that no one area experiences excessive pressure.

Figure 5:
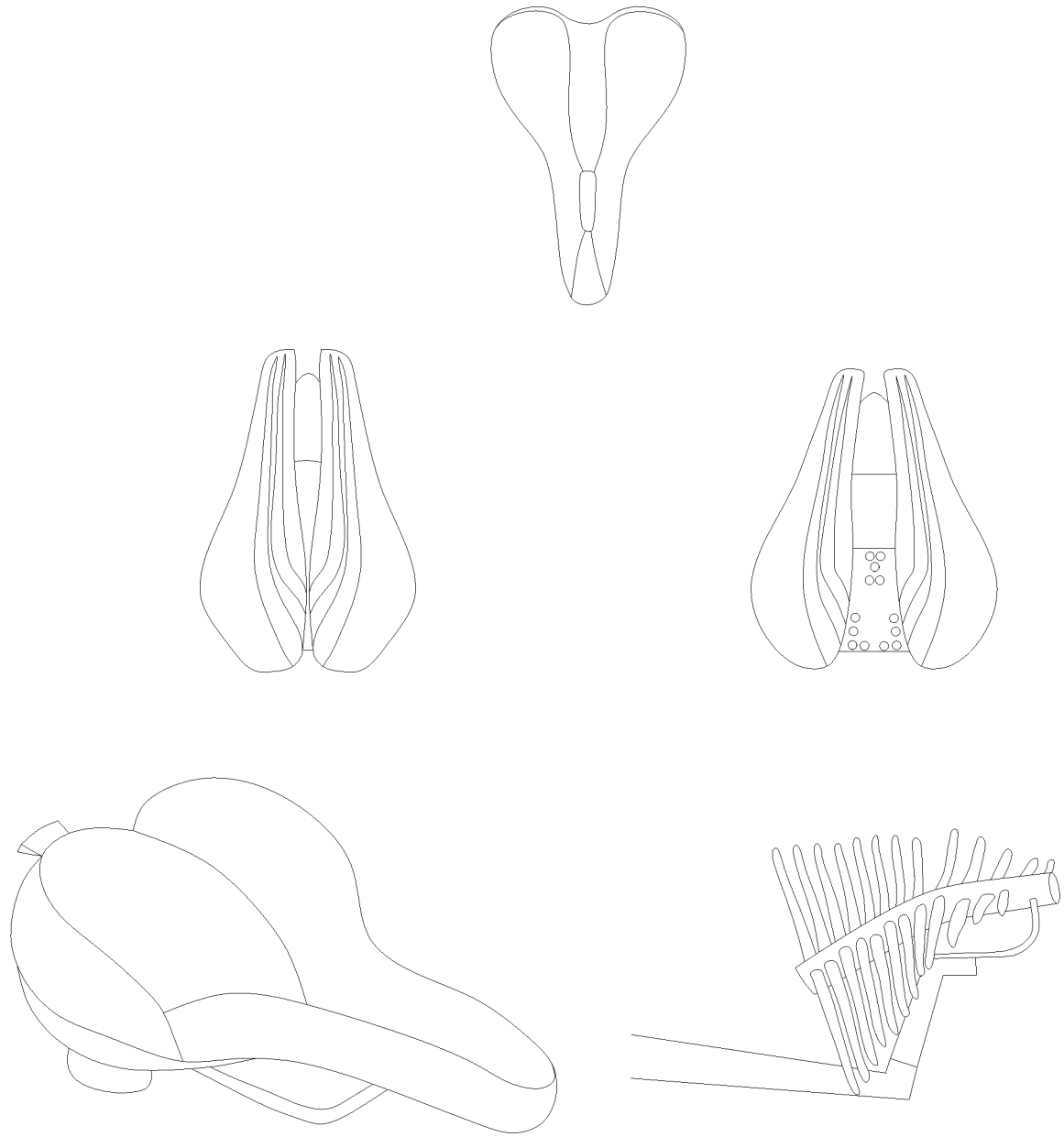
FIG. 5 an illustration of previous bicycle seat designs.

FIG. 5 includes illustrations of previous bicycle seat designs. The common seat design is shaped to have a wide, cushioned area at the rear to receive the rider's weight and a narrow area in the front to allow the freedom of motion in the leg necessary for pedaling. To ensure a full range of motion, the surface area of the seat is limited, which limits the amount of support available for rider weight. Some designs, as seen on the bottom right of FIG. 5, are configured to flex or move with the rider, but still have areas of high pressure The primary source of discomfort for cyclists is high pressure localized on a small and sensitive portion of the rider's buttocks. High pressure is common on the IT's as much of the rider's weight is focused on the point created by the bones' structure. The rider's weight resting on the IT's may also apply pressure to the origin of the hamstring muscles and cause damage. This pressure may move across the seat as the rider moves to pedal. High pressure traveling across the seat can result in shear forces, rubbing, and discomfort for the rider.

As described above, pelvis width may vary among cyclists. If a person with a wide pelvis rides a narrow seat, they are more likely to put pressure on their tailbone, perineum, or soft tissues, which can result in soreness and damage. Though some seats are available with adjustable widths, many cyclists are unable to tune the width to suit their own anatomy. Furthermore, seeking profession fitting advice can be costly and beyond the reach of many casual cyclists.

Further Design Considerations

Figure 6:
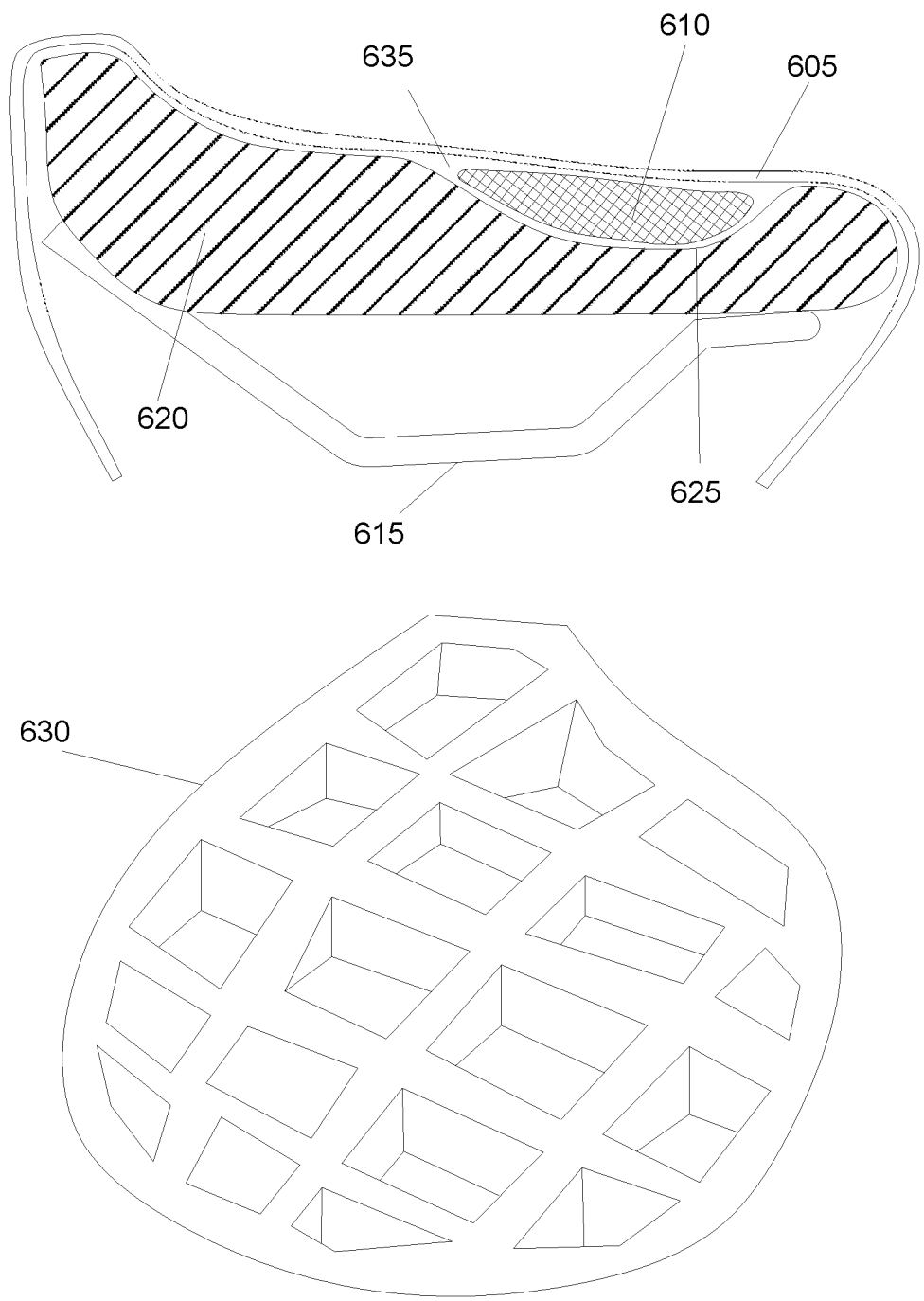
FIG. 6 is an illustration of further pressure relieving components of the bicycle seats, according to some embodiments.

FIG. 6 includes illustrations of various pressure relieving components configurations of bicycle seats, according to some embodiments. The pressure relieving regions corresponding to the rider's IT may be implemented in different forms and configurations.

In some embodiments, the seat element 620 may include an indented region 625 at the IT region 610, which may correspond to the rider's IT. The seat element 620 may be enclosed by a cover 605 that is tensionably coupled to the support frame 615 and covering a portion of the seat element 620 that includes at least the pressure-relieving IT region 610. The cover 605 at the indented region 625 may form a hammock-like configuration that supports the weight of the rider like a sling. The cover 605 may take the form of a textile that stretches across the seat element 620. When the cover 605 is stretched over the indented region, an empty space 635 is formed. As shown in FIG. 6, in some embodiments the empty space 635 may contain an IT region 610.

In various embodiments, the IT region 610 may correspond to the empty space 635 and may take various forms. In some embodiments, the empty space 635 may be filled with gel, foam, elastomer, or encapsulated air to form a cushioned IT region 610. In some embodiments, the empty space may be left empty and the IT region 610 may be formed simply by the tension of the cover 605, thus preventing the IT bones from contacting the seat element 620 or lessening the amount of pressure between the IT bones and seat element 620. The cover 605 material may be attached around the edges of the IT region 610 or underneath the seat with a tensioning mechanism allowing for adjustment to comfort and personal preference. The cover 605 material may include fabric, plastic, silicon, or elastomer. The cover 605 material may have some stretch to conform to the user's anatomy and distribute forces over the entire contact area while also providing support.

In other embodiments, the IT region 610 may be filled with an elastomer 630 having a three-dimensional reticulated structure. The elastomer 630 may be configured such that it has a lower spring constant in the center than at the edges such that the elastomer 630 will conform to the user and not collapse. For example, the grid-like geometry of the elastomer 630 may densify at the edges and have a gradient of density that lowers toward the center of the elastomer 630. The gradient of density may provide a smooth transition between the IT region 610 and the seat element 620. In some embodiments, the IT region 610 may be comprised of a material other than the elastomer that has a similar gradient of density. The material of the IT region 610 further offers shear force relief as the IT travels by collapsing or stretching with the motion of the rider. The material of the IT region 610 has a low hysteresis so that it may offer continuous support over time.

Figure 7:
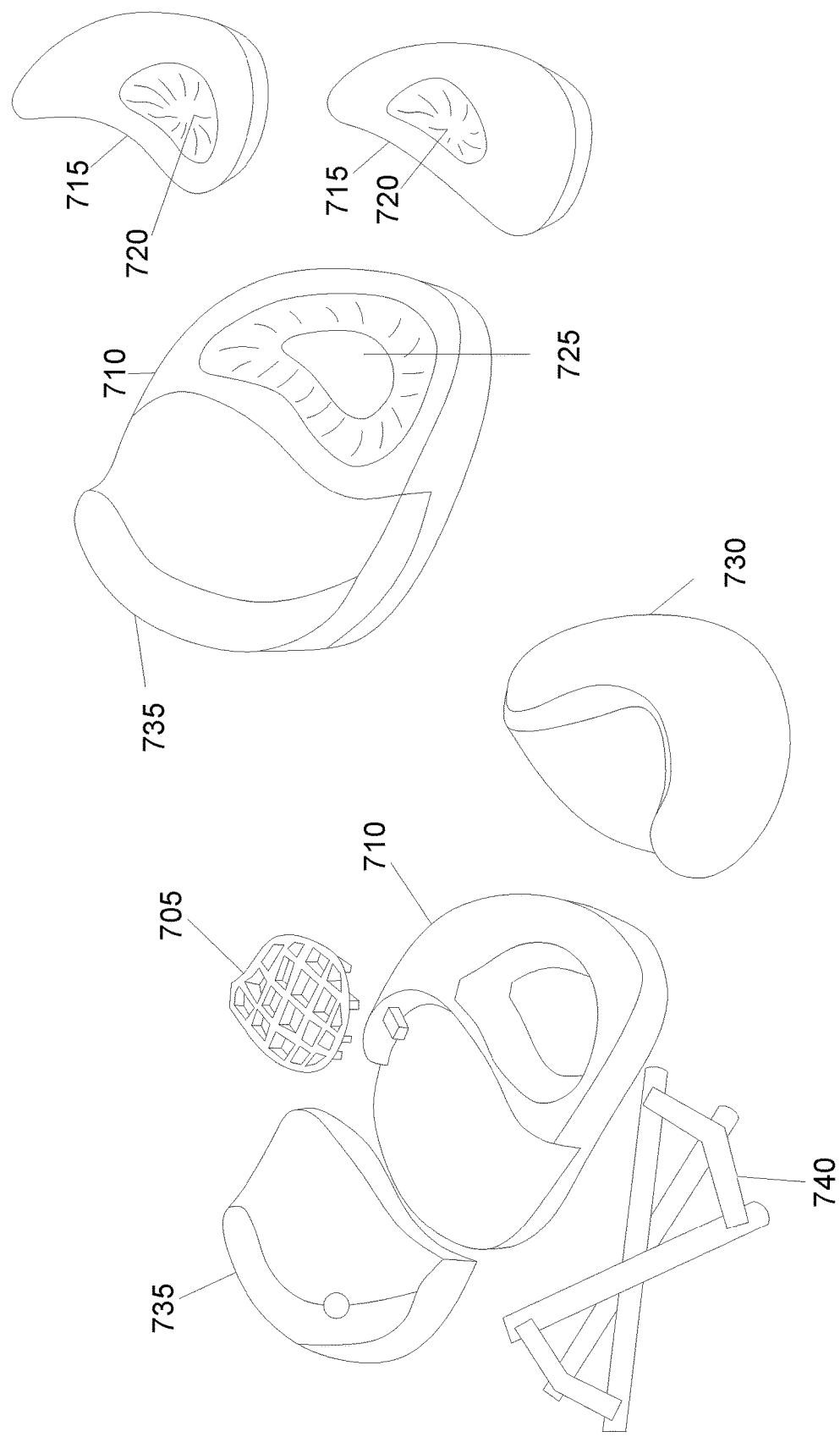
FIG. 7 is an illustration of interchangeable portions of the bicycle seat, according to some embodiments.

FIG. 7 is an illustration of interchangeable portions of the bicycle seat, according to some embodiments. In some embodiments, the seat element may be made up of multiple interchangeable parts. The modularized seat element may include a back portion 735, a mid portion 710, and a front portion 730. The back portion 735, mid portion 710, and front portion 730 may be supported by the frame 740 and each be removably coupled to the frame 740. The portions of the seat element may be interchangeable such that the rider can choose their preferred fit. The portions of the seat element may also be made up of different materials such that the rider can choose some sections of the seat to be firmer than others. The mid portion 710 may have a slot 725 into which inserts 715 can be placed. Each insert 715 may have an IT region 720 having a different shape and size such that a rider can choose which insert 715 conforms best to their body. In some embodiments the slot 725 may be filled by an elastomer 705 having a three dimensional reticulated structure that acts as a pressure relieving region. In some embodiments the forward edge (front portion 730) is comprised of foam while the rear portion 735 is rigid and the mid-region 710 carries a pressure-relieving region. In some embodiments, the back portion 735 may have a raised rear portion as seen in FIG. 1 to increase the surface area of the overall seat element.

The IT regions 715 may be designed modularly such that no adhesive is necessary to couple the IT region to the mid portion 710 and the IT regions 715 may be interchangeable. The IT regions may have attachment fittings such as snap-ons to removably couple them to the mid portion 710. In some embodiments the IT region 715 may be coupled to other portions of the seat element.

Figure 8:
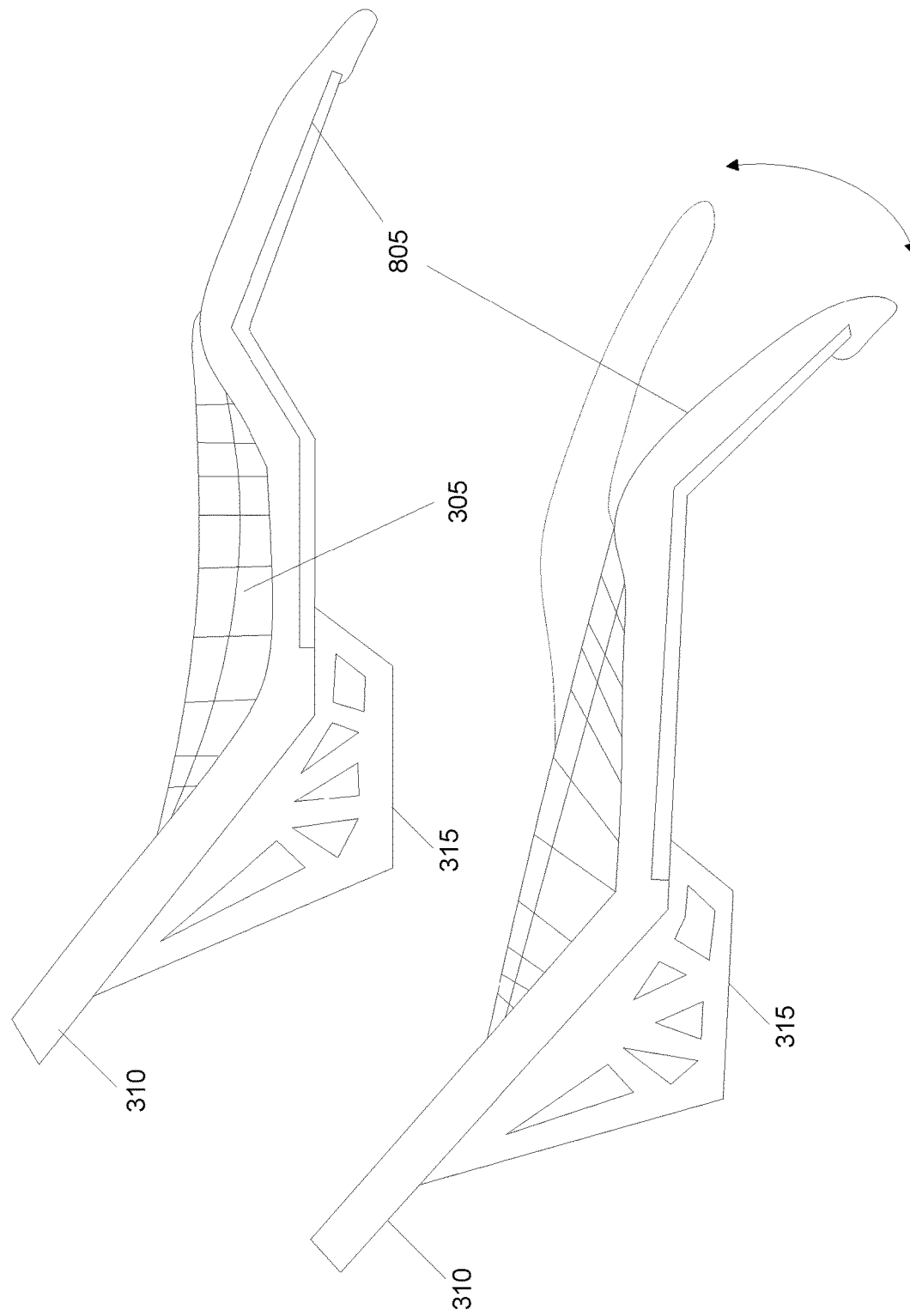
FIG. 8 is a side-view illustration of the bicycle seat with flexible forward edge, according to some embodiments.

FIG. 8 is a side-view illustration of the bicycle seat with flexible forward edge, according to some embodiments. The bicycle seat of FIG. 8 may be an embodiment of the seat element 310 of FIG. 3 having a flexible forward edge 805. The majority of the seat element 310 is rigid with the exception of the forward edge 805. In some embodiments, the entire seat element 310 may be rigid but have a hinge such that the forward edge 805 can move with the rider. The flexible forward edge 805 is configured with a variable displacement such that the forward edge forms a curvature conforming to the rider. In some embodiments, the flexible forward edge 805 may be split such that one half of the flexible forward edge, a first seat element, moves with the right leg of the rider while the other half, a second seat element, moves with the left leg of the rider. In this embodiment the seat elements are configured to flex independently responsive to the motion of the legs of the rider.

This forward edge 805, is sufficiently stiff to provide support so that the rider does not slide off or get pitched forward, but also flexible enough to bend when the leg extends to push pedals. The forward edge returns to its original shape when the cyclist's leg is not applying pressure, providing energy recovery. The flexible forward edge may be composed of a spring like mechanism of a material such as steel, elastomers, plastic, and others, or it may be a linkage connecting the forward edges of the two sides of the bike seat, using the cyclist's own opposing movements. Such a mechanism may be designed with a variable displacement or spring stiffness along the flexible forward edge to provide optimal comfort.

Figure 9:
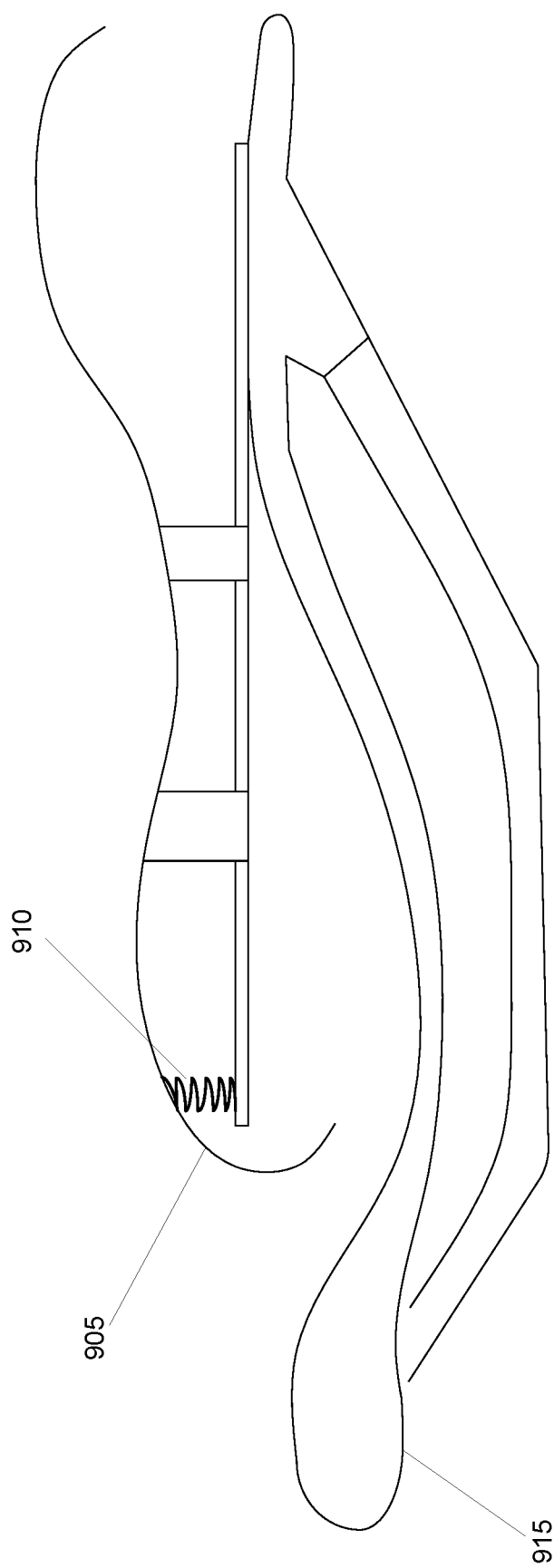
FIG. 9 is a side, cross-sectional view of the bicycle seat with a spring-supported flexible forward edge, according to some embodiments.

FIG. 9 is a side, cross-sectional view of the bicycle seat with a spring-supported flexible front edge 905, according to some embodiments. In some embodiments, the material of the flexible forward edge 905 itself is not flexible, but the support of the forward edge 905 may be compressible such that the forward edge 905 moves with the rider. For example, the forward edge 905 may be made of a rigid material to provide support that conforms to the rider. The forward edge 905 is supported by a spring 910 associated with the seat element. As the weight of the rider shifts forward the spring 910 may compress to lower the forward edge 905 and extend when the rider restores their position. The nose 915 is configured to be rigid such that the forward pitch of the forward edge 905 does not cause instability to the rider. The nose 915 may be used to provide balance and support.

Figure 10:
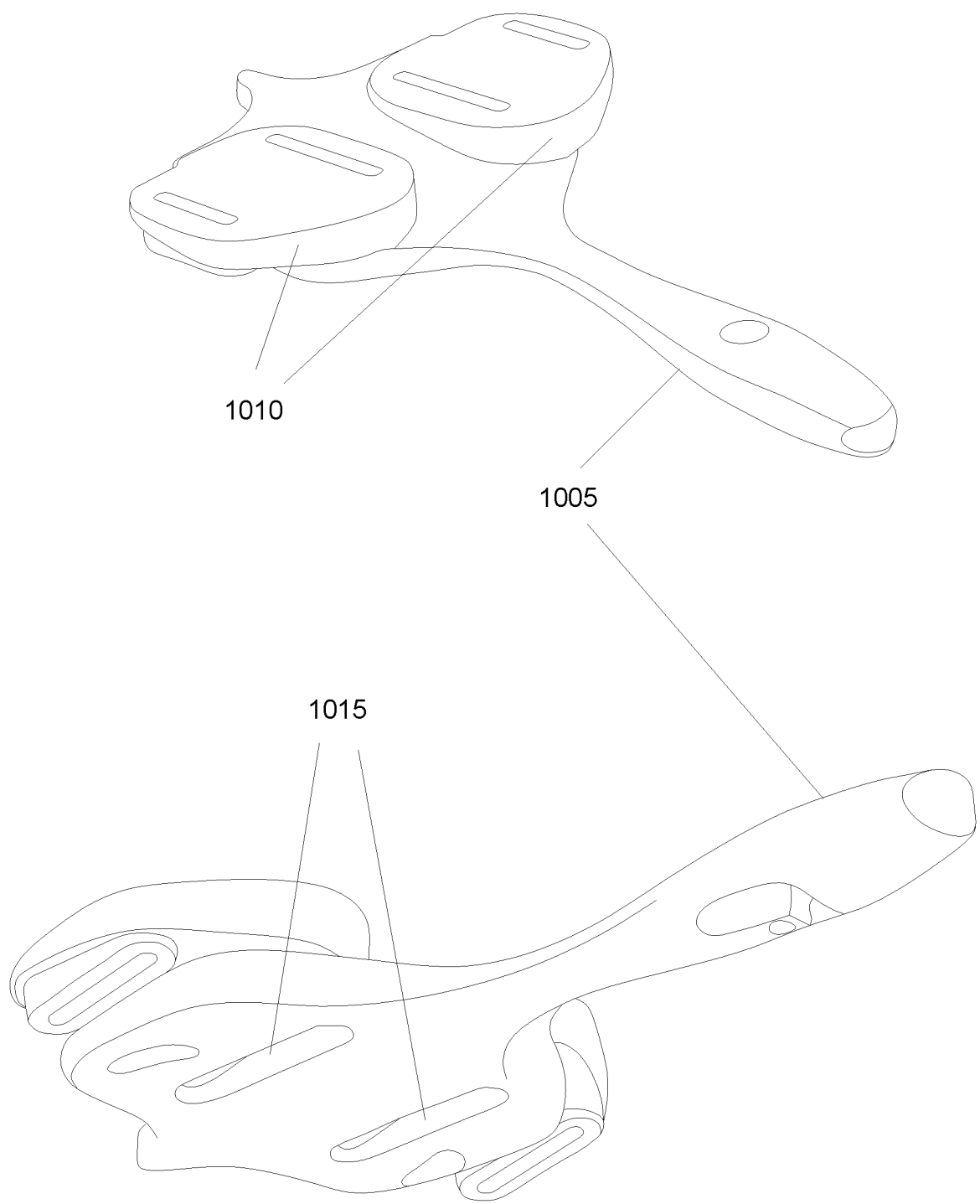
FIG. 10 is a top and bottom view of a support frame of the bicycle seat.

FIG. 10 is a top and bottom view of a support frame of the bicycle seat. In some embodiments, the support frame is configured to allow for adjustment of portions of the bicycle seat. For example, the notch on the nose support portion 1005 may allow for the height of the nose of the seat to be adjusted. The seat element portions 1010 may slide along rails 1015 to adjust the position or width of the rear portion of the seat that supports the weight of the rider. This allows the rider to adjust the location of the pressure relieving regions to correspond to the width of the IT bones of the rider. In some embodiments, the seat element portions 101 may be configured to pivot to further allow for adjustability of the orientation of the seat element and IT regions. Other adjustment mechanisms may be incorporated to the support frame to allow for further adjustability of the seat.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps, and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not always imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A seat for a pedal-powered vehicle, the seat comprising:
   a support frame;
   a nose; and
   a left seat element and a right seat element, wherein the left seat element, the right seat element, and the nose are implemented as separate components that are each separately supported by the support frame, and wherein the left seat element and the right seat element are configured to support at least part of a rider's weight, and wherein the left seat element carries a left pressure-relieving region that is configured to be located at a left location corresponding to an ischial tuberosity (IT) of the rider and a left flexible forward edge that is configured to move with a left leg of the rider, the right seat element carries a right pressure-relieving region that is configured to be located at a right location corresponding to IT of the rider and a right flexible forward edge that is configured to move with a right leg of the rider, and wherein the left seat element and the right seat element are separated and the left and right flexible forward edges are configured to pivot independently of each other.

2. The seat of claim 1, wherein at least one of the left seat element or the right seat element carries a cushion material that has a first spring constant, the left or right pressure-relieving region has a second spring constant less than the first spring constant.

3. The seat of claim 1, wherein the pedal-powered vehicle is a bicycle.

4. The seat of claim 1, wherein at least one of the left or right pressure-relieving region is comprised of elastomer, foam, gel, or some combination thereof.

5. The seat of claim 1, wherein at least one of the left or right pressure-relieving region is comprised of a three-dimensional reticulated structure.

6. The seat of claim 1, further comprising a cover tensionably coupled to at least one of the left seat element or the right seat element, the cover covering a portion of the at least one of the left seat element or the right seat element, the portion comprising at least the left or right pressure-reliving region.

7. The seat of claim 6, wherein the cover and the at least one of the left seat element or the right seat element form an enclosed area, the enclosed area filled with air or gel.

8. The seat of claim 1, wherein the support frame is adjustable to adjust the location of at least one of the left or right pressure-relieving region.

9. The seat of claim 8, wherein the support frame is adjustable for the width of the rider's IT's.

10. The seat of claim 8, wherein the support frame is adjustable for orientation of at least one of the left or right pressure-relieving region.

11. The seat of claim 1, wherein a rear portion of at least one of the left seat element or the right seat element is rigid and at least one of the left flexible forward edge or right flexible forward edge is flexible.

12. The seat of claim 11, wherein the at least one of the left flexible forward edge or the right flexible forward edge is configured with a variable displacement such that the forward edge forms a curvature conforming to the rider.

13. The seat of claim 11, wherein the at least one of the left flexible forward edge or right flexible forward edge is supported by a spring.

14. The seat of claim 11, wherein the at least one of the left flexible forward edge or the right flexible forward edge is comprised of foam and the at least one of the left seat element or the right seat element further comprises a mid-region positioned between the rigid rear portion and the at least one of the left flexible forward edge or the right flexible forward edge, the mid-region comprising the left or right pressure-relieving region.

15. The seat of claim 1, wherein the left and the right pressure-relieving regions are removably attached to the corresponding seat element such that the pressure-relieving regions can be interchanged with other pressure-relieving regions of a plurality of pressure-relieving regions.

16. The seat of claim 15, wherein each pressure-relieving region is encompassed by a larger insert, the larger insert being modular and interchangeable with other larger inserts.

17. A bicycle, comprising:
   a seat comprising:
      a support frame;
      a nose; and
      a left seat element and a right seat element, wherein the left seat element, the right seat element, and the nose are implemented as separate components that are each separately supported by the support frame, and wherein the left seat element and the right seat element are configured to support at least part of a rider's weight, and wherein the left seat element carries a left pressure-relieving region that is configured to be located at a left location corresponding to an ischial tuberosity (IT) of the rider and a left flexible forward edge that is configured to move with a left leg of the rider, the right seat element carries a right pressure-relieving region that is configured to be located at a right location corresponding to IT of the rider and a right flexible forward edge that is configured to move with a right leg of the rider, and wherein the left seat element and the right seat element are separated and the left and right flexible forward edges are configured to pivot independently of each other;
   a body comprising rigid connectors configured to connect and support at least a set of handlebars, the support frame, a set of pedals, and one or more wheels; and
   the one or more wheels configured to rotate responsive to the set of pedals being pushed.

18. The bicycle of claim 17, wherein at least one of the left seat element or the right seat element carries a cushion material that has a first spring constant, the left or right pressure-relieving region has a second spring constant less than the first spring constant.

19. The bicycle of claim 17, wherein at least one of the left or right pressure-relieving region is comprised of elastomer, foam, gel, or some combination thereof.

* * * * *